No. 685,497. Patented Oct. 29, 1901.
J. J. TONKIN.
GAS AND OIL SEPARATOR.
(Application filed Mar. 2, 1901.)
(No Model.) 2 Sheets—Sheet 1.

WITNESSES:

INVENTOR
John J. Tonkin
By E. Laass
ATTORNEY.

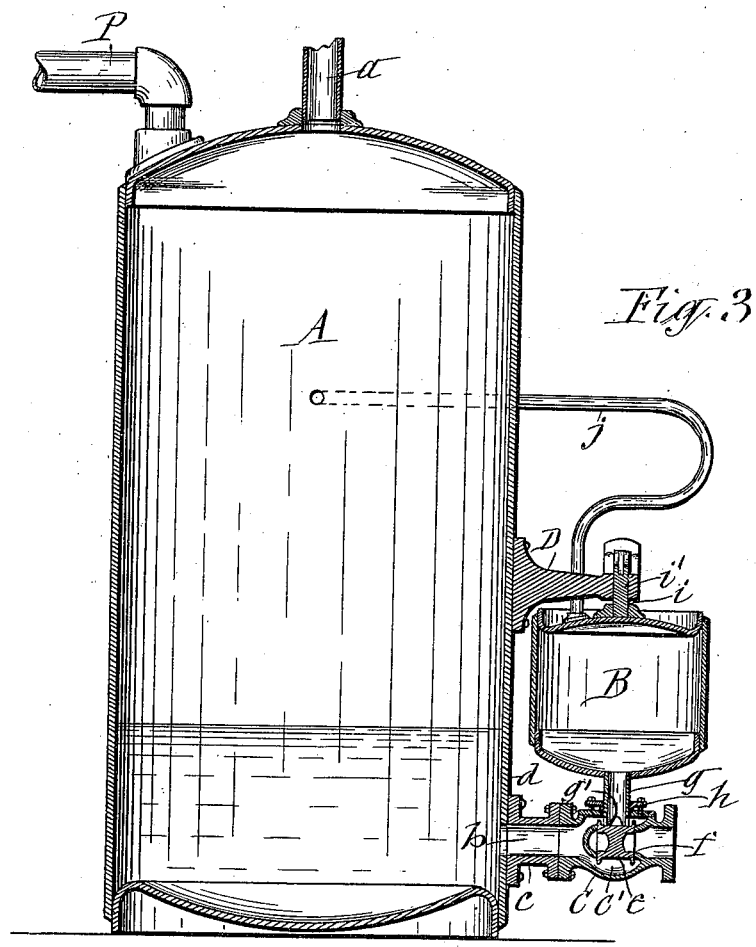

UNITED STATES PATENT OFFICE.

JOHN J. TONKIN, OF OSWEGO, NEW YORK.

GAS AND OIL SEPARATOR.

SPECIFICATION forming part of Letters Patent No. 685,497, dated October 29, 1901.

Application filed March 2, 1901. Serial No. 49,539. (No model.)

*To all whom it may concern:*

Be it known that I, JOHN J. TONKIN, a citizen of the United States, and a resident of Oswego, in the county of Oswego, in the State of New York, have invented new and useful Improvements in Gas and Oil Separators, of which the following, taken in connection with the accompanying drawings, is a full, clear, and exact description.

This invention relates to the class of apparatus which are employed at oil-wells to separate the gas from the oil in transit to the storing-tank.

The object of the invention is to provide an apparatus which shall be simple in construction and efficient, reliable, and durable in its operation of separating the gas from the oil; and to that end the invention consists, essentially, in the combination, with the separating-tank provided with an oil and gas inlet and a gas-outlet at its top, an oil-outlet at its base, and a valve controlling said oil-outlet, of a vertically-movable receptacle communicating with said tank to receive oil therefrom and provided with a gas-outlet and connected to the valve to open the same by the descent imparted to the receptacle by the weight of the oil contained therein; and the invention also consists in certain novel features of the details of the apparatus, as hereinafter described, and set forth in the claims.

Figure 1:
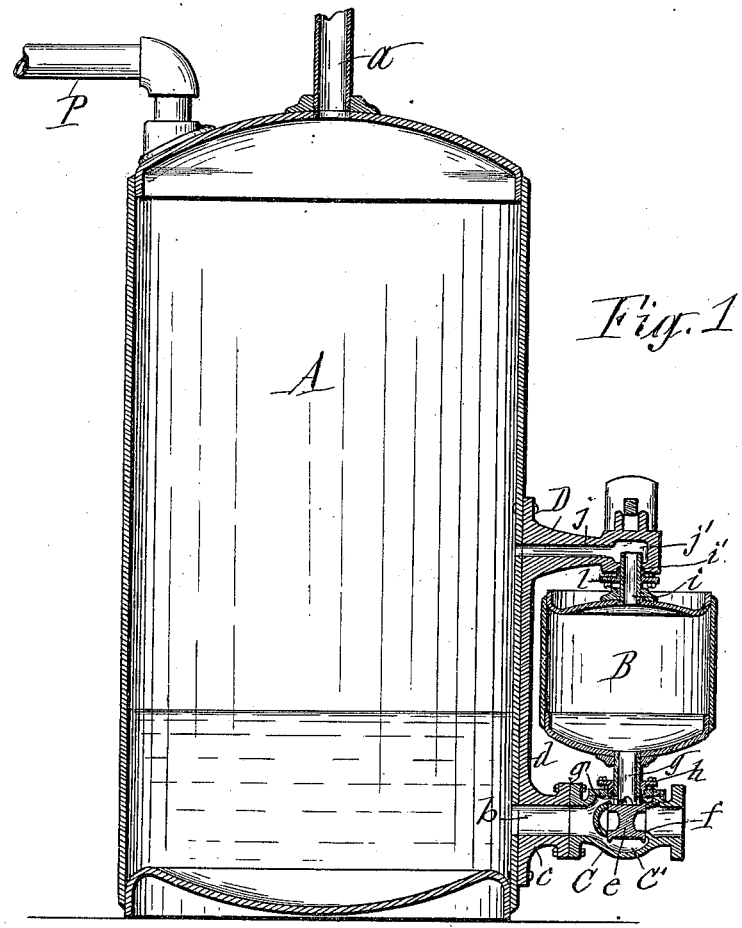
Figure 2:
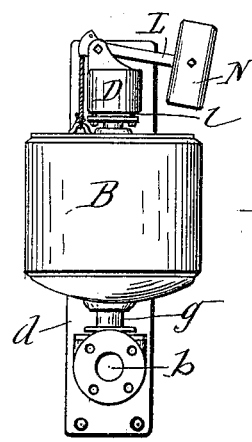

In the annexed drawings, Figure 1 is a vertical transverse section of a gas and oil separator embodying my invention. Fig. 2 is a side view of the vertically-movable receptacle which controls the discharge of the oil from the separator-tank, and Fig. 3 is a vertical transverse section of a modification of my invention.

Similar letters of reference indicate corresponding parts.

A represents the separator-tank, usually formed of sheet-steel or boiler-iron and air-tight, with the exception of the inlet and outlet pipes, as hereinafter described. The top of said tank has attached to it the pipe P, which conveys the oil and gas from the well to the interior of the tank. From said top also extends the gas-outlet pipe $a$, which conveys the gas to the place where it is to be utilized.

The base or lower portion of the tank A is provided with the oil-outlet $b$, which communicates with a tubular projection $c$ on a plate $d$, fastened to the outer side of the tank. To the projection $c$ is attached a valve-cage C, formed with a chamber $C'$, in which is arranged a vertically-movable valve $e$, which controls the escape of the oil through the outlet and closes the same in the upward movement of the valve.

B denotes a vertically-movable receptacle, preferably of the form of a cylindrical tank, which has attached to its bottom a depending induction-pipe $g$, the lower end of which passes through a stuffing-box $h$, applied to the top of the valve-cage C, and is attached to the valve $e$, so as to close said valve by the upward movement of the receptacle B. The pipe $g$ is provided with ports $g'$ immediately above the valve to be in constant communication with the tank A. To sustain this receptacle in upright position, the top of the receptacle is provided at its center with an upwardly-projecting stem $i$, which passes through a guide $i'$ in the free end of an arm D, projecting laterally from an upward extension of the plate $d$.

The valve $e$ is normally closed by the receptacle B being lifted by a suitable counterpoise N, which I preferably connect to the free end of a lever L, which is fulcrumed on a suitable support on the arm D and has its opposite end connected to the receptacle B.

$j$ represents a gas-duct, which may consist of a flexible tube extending from near the top of the receptacle B to the interior of the tank A, as shown in Fig. 3 of the drawings, or said gas-duct may be formed of a longitudinal channel in the interior of the stationary arm D, which channel communicates at one end with the interior of the tank A and terminates at the opposite end with a vertical enlargement $j'$, the bottom of which is provided with an opening and with a stuffing-box $l$ in said opening, receiving through it the upper end of the gas-escape pipe, constituting the stem $i$, which in conjunction with the stuffing-box $l$ guides and sustains the receptacle in upright position, as represented in Fig. 1 of the drawings.

In the operation of the described apparatus the valve $e$ is normally closed by the counterpoise N. The oil flowing through the pipe P into the tank A is thus caused to accumulate in said tank, and during said accumulation the oil flows through the ports $g'$ in the pipe $g$ and up through said pipe to the interior of the receptacle B, wherein it accumulates correspondingly with the oil in the tank A. The counterpoise N is adjusted to yield to a predetermined amount of additional weight applied to the receptacle B by the influx of the oil, and thus said receptacle is caused to descend and open the valve $e$ to allow the oil to escape from both the tank A and receptacle B. The relief of said receptacle from the weight of the oil causes the counterpoise N to lift the receptacle, and thereby close the valve $e$, which again causes accumulation of oil in the tank A, as aforesaid. The agitation of the oil incident to its dropping from the inlet-pipe P at the top of the tank and the circulation of the oil from the tank to the receptacle B cause the gas to rise from the oil and escape through the outlet-pipe $a$. The oil thus separated from the gas is allowed to escape at proper intervals through the outlet $b$.

What I claim is—

1. The combination, with the tank provided with an oil-inlet and a gas-outlet at its top, and an oil-outlet at its base, of a vertically-movable receptacle communicating with said tank to receive oil therefrom and provided at its top with a gas-outlet, and a valve in the oil-outlet of the tank controlled by the movement of the aforesaid receptacle as set forth.

2. The combination, with the tank provided with an oil-inlet and a gas-outlet at its top and an oil-outlet at its base, of a vertically-movable receptacle communicating at its base with the base of the interior of the tank, a gas-duct leading from the top of said receptacle to the interior of the tank, and a valve in the oil-outlet of the tank controlled by the movement of the receptacle as set forth.

3. The combination, with the tank provided with an oil-inlet and a gas-outlet at its top, and an oil-outlet at the base of the tank, a valve controlling said oil-outlet, of a vertically-movable receptacle communicating with said tank to receive oil therefrom and connected to said valve to open the same by gravity of the receptacle and oil contained therein, and a gas-duct leading from the receptacle to the interior of the tank as set forth.

4. The combination, with the gas and oil separator-tank provided with an oil-outlet at its base and with a valve in said outlet, of a vertically-movable receptacle communicating with the interior of the tank to receive oil therefrom and connected to said valve to open the same by the descent imparted to the receptacle by the weight of the oil contained therein, and a counterpoise lifting the empty receptacle and thereby closing the valve as set forth.

5. The combination, with the gas and oil separator-tank provided at its base with an oil-outlet, a chamber in said outlet, and a valve in said chamber, of a vertically-movable receptacle provided on its bottom with a depending inlet-pipe extending into the aforesaid chamber and attached to the valve therein and having ports communicating with the chamber, a stationary guide sustaining the receptacle in upright position, a counterpoise lifting the receptacle and thereby closing the aforesaid valve, and a gas-duct leading from the top of said receptacle to the interior of the tank as set forth.

6. The combination, with the gas and oil separator-tank provided at its base with an oil-outlet, and a valve in said outlet, of a vertically-movable receptacle provided on its bottom with a depending inlet-pipe communicating with the base of the interior of the tank and actuating the aforesaid valve, an arm projecting from the tank and guiding the top of the receptacle, a lever fulcrumed on said arm and connected at one end to the receptacle, and a counterpoise connected to the opposite end of said lever as set forth.

7. The combination, with the gas and oil separator-tank provided with an oil-outlet at its base and a valve in said outlet, of a vertically-movable receptacle provided at its bottom with a depending inlet-pipe communicating with the base of the interior of the tank and actuating the aforesaid valve, an arm projecting from the side of the tank and formed with an internal longitudinal channel communicating at one end with the interior of the tank, a pipe projecting from the top of the aforesaid receptacle and communicating with the channel of the aforesaid arm, and a counterpoise lifting the receptacle and thereby closing the aforesaid valve as set forth.

8. The combination, with the gas and oil separator-tank, of a vertically-extended plate secured at the outer side of the tank and formed at its lower end with an oil-outlet projection communicating with the lower portion of the tank, the upper end of said plate formed with a laterally-projecting arm provided with a longitudinal internal channel communicating at one end with the interior of the tank and terminating at the opposite end with a vertical enlargement having an opening in its bottom, a stuffing-box applied to said opening, a valve-cage attached to the aforesaid oil-outlet projection, a vertically-movable valve in said cage controlling the escape of the oil from the tank, an opening in the top of the valve-cage, a stuffing-box applied to said opening, a receptacle having a vertical oil-inlet pipe extending from its bottom and through the stuffing-box on the valve-cage and connected to the valve, a gas-outlet pipe extending from the top of said receptacle and through the stuffing-box on the aforesaid laterally-projecting arm, and a counterpoise lifting said receptacle as set forth.

JOHN J. TONKIN. [L. S.]

Witnesses:
FRED D. WHEELER,
A. B. COGSWELL.